US012748086B2

(12) United States Patent
Wolf et al.

(10) Patent No.: US 12,748,086 B2
(45) Date of Patent: Sep. 29, 2026

(54) SUPPORT FIXTURE FOR CHROMATOGRAPHY COLUMNS

(71) Applicant: Takeda Pharmaceutical Company Limited, Osaka (JP)

(72) Inventors: Adam Wolf, Vienna (AT); Thomas Gatternig, Vienna (AT); Paul Majneri, Vienna (AT)

(73) Assignee: Takeda Pharmaceutical Company Limited, Osaka (JP)

( * ) Notice: Subject to any disclaimer, the term of this patent is extended or adjusted under 35 U.S.C. 154(b) by 527 days.

(21) Appl. No.: 18/264,150

(22) PCT Filed: Feb. 7, 2022

(86) PCT No.: PCT/IB2022/000070

§ 371 (c)(1),
(2) Date: Aug. 3, 2023

(87) PCT Pub. No.: WO2022/167869

PCT Pub. Date: Aug. 11, 2022

(65) Prior Publication Data

US 2023/0393105 A1 Dec. 7, 2023

Related U.S. Application Data

(60) Provisional application No. 63/147,116, filed on Feb. 8, 2021.

(51) Int. Cl.

*G01N 30/60* (2006.01)
*B01L 9/00* (2006.01)
*G01N 30/24* (2006.01)

(52) U.S. Cl.

CPC ............ *G01N 30/6047* (2013.01); *B01L 9/00* (2013.01); *G01N 30/24* (2013.01); *B01L 2200/02* (2013.01); *B01L 2300/043* (2013.01)

(58) Field of Classification Search

None

See application file for complete search history.

(56) References Cited

U.S. PATENT DOCUMENTS

2011/0014722 A1 1/2011 Sakowski et al.
2014/0038192 A1* 2/2014 Buse ......................... B01L 7/52 435/6.12

(Continued)

FOREIGN PATENT DOCUMENTS

CN 109126203 A 1/2019
CN 212459565 U 2/2021

(Continued)

OTHER PUBLICATIONS

Office Action dated Dec. 9, 2025, from corresponding Japanese Patent Application No. 2023-547603.

(Continued)

*Primary Examiner* — Matthew D Krcha

(74) *Attorney, Agent, or Firm* — Honigman LLP; Andrew J. Boes; Jonathan P. O'Brien

(57) ABSTRACT

A support fixture for chromatography columns operated by a liquid handling robot includes a frame and a lid. The frame has a base and a column stand extending upward from the base. The frame also includes bores extending vertically between the base and an upper portion of the column stand. The lid is movably attached to the upper portion of the column stand and has openings that axially align with the bores in the frame. The lid is movable between an open position configured to allow insertion of chromatography columns into the bores and a closed position configured to secure the chromatography columns in the bores.

19 Claims, 9 Drawing Sheets

(56) References Cited

U.S. PATENT DOCUMENTS

| | | | | |
|---|---|---|---|---|
| 2015/0132841 A1* | 5/2015 | Sampson | B01L 9/06 422/561 |
| 2017/0043346 A1* | 2/2017 | Welch | B65D 25/24 |

FOREIGN PATENT DOCUMENTS

| | | | | |
|---|---|---|---|---|
| CN | 212882518 B | 4/2021 | |
| JP | 2000514563 A | 10/2000 | |
| JP | 2010169613 A | 8/2010 | |
| JP | 2014145779 A | 8/2014 | |
| WO | WO-2013135878 A1 * | 9/2013 | G01N 35/1081 |

OTHER PUBLICATIONS

International Search Report and Written Opinion dated Aug. 19, 2022 from corresponding PCT Application No. PCT/IB2022/000070.

* cited by examiner

FIG. 4
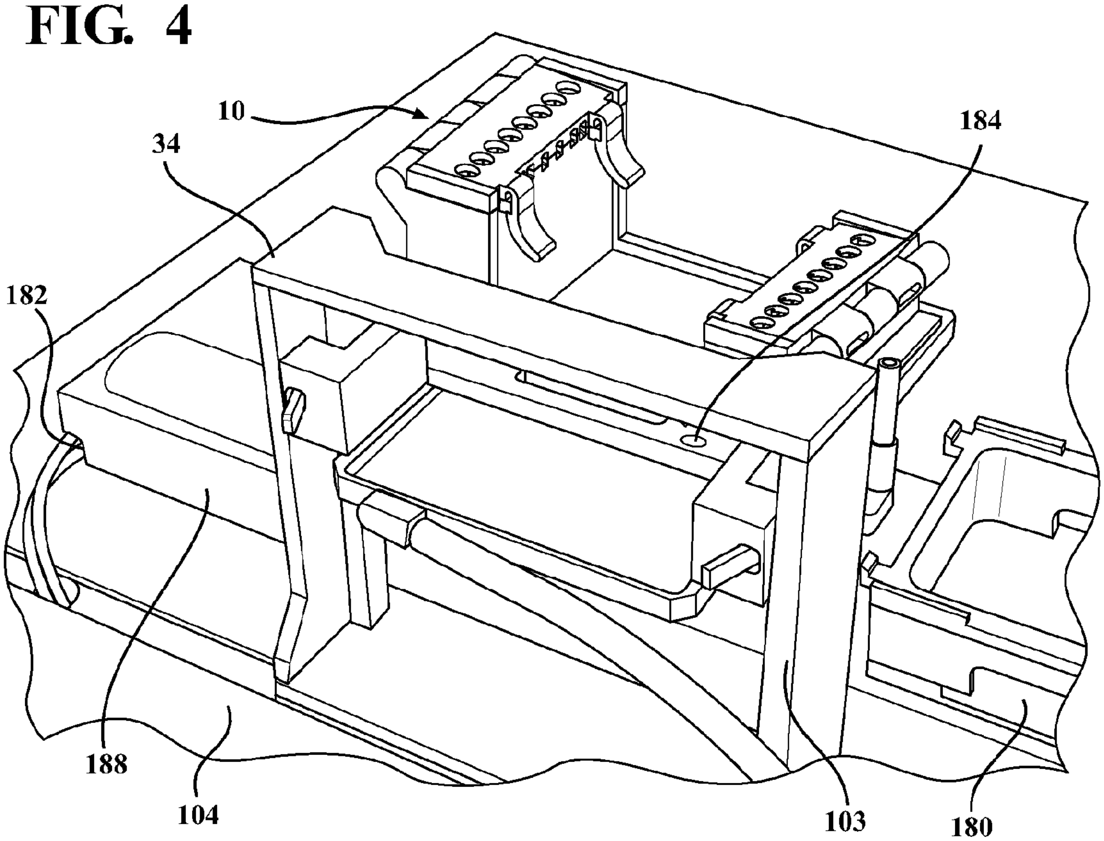
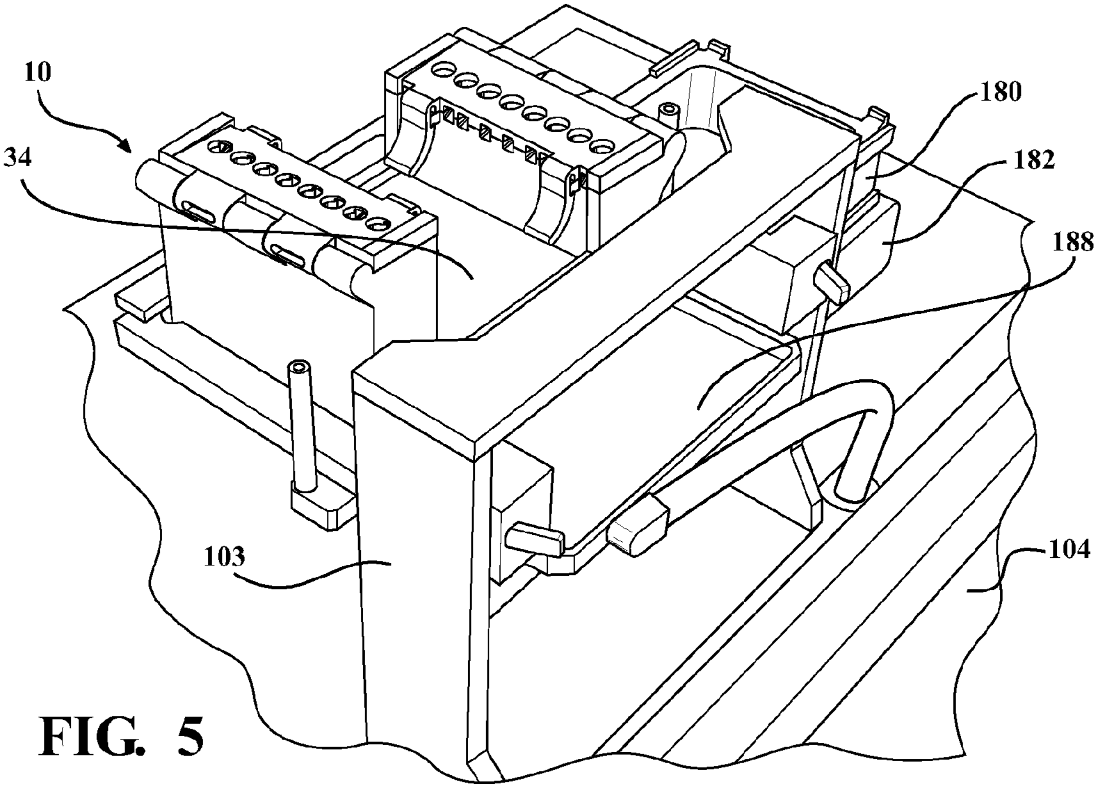
FIG. 5

SUPPORT FIXTURE FOR CHROMATOGRAPHY COLUMNS

CROSS REFERENCE TO RELATED APPLICATIONS

This application claims priority to PCT Application No. PCT/IB2022/000070, filed Feb. 7, 2022, which claims priority under to U.S. Provisional Application 63/147,116, filed on Feb. 8, 2021. The disclosures of this the prior applications is are considered part of the disclosure of this application and is are hereby incorporated by reference in its entirety.

TECHNICAL FIELD

This disclosure relates to chromatography column supports, such as stands and racks for holding chromatography columns used by liquid handlers in a laboratory.

BACKGROUND

Liquid handling or pipetting robots are commonly used to perform or operate chromatography columns, such as for microscale biological process development. The liquid handling robots automate tasks in the operation of the chromatography columns for reducing the risk of process errors. In general, the liquid handling robots pipette liquids into a set of chromatography columns so that samples can be collected below the columns. The chromatography columns are typically held in an array plate that is supported above a well plate, which is used to collect samples from the columns suspended above the well plate.

During execution of the pipetting tasks, pipetting tips or needles are repeatedly inserted into and removed from the chromatography columns. The insertion of the pipetting tips can result in an error when the chromatography columns do not align with the pipetting tips. Also, mechanical errors can occur when the pipetting tips are removed from the chromatography columns, such as to cause the columns to dislodge from the array plate or to misalign the columns in the array plate. More specifically, the frictional force resisting the tips from withdrawing from the upper end of the columns can be greater than the friction or other force holding the columns in the array plate, causing the columns to momentarily or completely dislodge from the array plate. These errors can damage the tips and columns, and may also spoil the collected samples.

To avoid errors with misaligned or dislodged columns, a liquid handling robot may be programmed to display a user prompt and to wait for confirmation from a human operator before or after a manipulation step that is problematic or otherwise prone to such errors. Human intervention and observation of tasks performed by the robot substantially reduces efficiencies of robotic systems, such as by requiring that liquid handling robots run these tasks during working hours, which prevents robotic operation outside of human working hours.

SUMMARY

The present disclosure provides a support fixture for chromatography columns that are used or operated by a liquid handling or pipetting robot, and also provides an associated automated liquid handling system having such a support fixture. The support fixture is designed to engage a series of chromatography columns, such as prepacked chromatography microcolumns used for rapid biological process development. The support fixture securely holds the chromatography columns relative to a station structure, such as a liquid handling robotic workstation, so that the chromatography columns maintain accurate alignment with tips that are manipulated by the robot. In some examples, the support fixture includes engagement features that lock to engage the chromatography columns in a secure and aligned manner, which prevents the chromatography columns from disengaging from the support fixture upon withdraw of the tips from the chromatography columns. The engagement features may be a snap-fit connection to allow the chromatography columns to be quickly disengaged and removed by the lab technician without the use of tools or other devices. Further, some examples of the support fixture can incorporate drainage features for collecting waste liquids that can leak or express from the pressurized chromatography columns and/or excess liquid that is dispensed by the robotically actuated tips.

According to one aspect of the present disclosure, a support fixture for chromatography columns operated by a liquid handling robot includes a frame and a lid. The frame has a base and a column stand extending upward from the base. The frame also includes bores extending vertically between the base and an upper portion of the column stand. The lid is movably attached to the upper portion of the column stand, such that the lid is movable between an open position configured to allow insertion of chromatography columns into the bores and a closed position configured to secure the chromatography columns in the bores. In the closed position, openings in the lid axially align with the bores in the frame, such as to be configured to receive pipetting tips or needles.

Implementations of the disclosure may include one or more of the following optional features. In some implementations, the upper portion of the column stand includes a peripheral surface that borders at least one of the bores, where the peripheral surface is configured to support a collar of a chromatography column inserted into the bore. Also, in some implementations, the frame includes a seat portion that protrudes into lower sections of the bores for supporting a bottom portion of the chromatography columns inserted in the bores. In some examples, the bores have a continuous interior surface that extends between the peripheral surface and the seat portion disposed at the lower sections of the bores. In some implementations, the bores are provided as a set of bores disposed in a row across the column stand, such as at least eight bores in the row.

In some examples, the frame has a mounting feature for attaching the support fixture to a worktable, such as to engage a locking mechanism on a bridge stand that suspends the support fixture above a well plate. For example, the base of the frame may include horizontal slots that mate with the locking mechanism on the bridge stand.

In further implementations, the lid includes a lower surface that surrounds at least one of the openings, such that with the lid in the closed position, the lower surface is configured to contact the collar of the chromatography column in the corresponding bore. Also, in some examples, the lid is pivotally coupled at a hinge connection with the upper portion of the column stand and is configured to pivot between the open and closed positions. The lid may also include an engagement feature that snap-fits to the column stand when the lid is moved to the closed position.

Moreover, in some examples, the bores each have a bottom hole in the base of the frame that is configured for liquid in the chromatography columns to dispense down through the bottom holes and into a collection plate, such as a well plate disposed below the support fixture. The bottom holes may also each be configured to receive a tip of a chromatography column. In some implementations, the bores each have a widened upper section in the column stand that is configured to prevent interference with labels or indicia disposed at an upper portion of the inserted chromatography columns. In some examples, the bores are sized to accommodate chromatography columns with a volume of 200 µl or 600 µl.

In further examples, the frame includes a second column stand that extends upward from the base and terminates at an upper portion thereof. The second column stand includes a second set of bores that extend vertically between the base and the upper portion of the second column stand. In some examples, the second set of bores are sized to support a different sized chromatography column than the first set of bores, such as a volume of 200 µl or 600 µl. In some implementations, a second lid is movably attached to the upper portion of the second column stand, where the second lid has openings that axially align with the second set of bores.

In additional implementations, the frame a drainage reservoir disposed adjacent to the column stand, such as between two separate column stands. The lid, in some examples, has a sloped surface descending from the openings toward the drainage reservoir, so that liquid that escapes a top opening of one of the chromatography columns in the bores descends the sloped surface and enters the drainage reservoir. Also, in some examples, the upper portion of the column stand has channels that extend from the bores toward the drainage reservoir to similarly direct waste fluid to the drainage reservoir.

According to another aspect of the present disclosure, an automated liquid handling system has a station structure with a worktable. A well plate is supported at the worktable, and a liquid handling robot includes an arm suspended above the worktable, where the arm has a set of tips configured to dispense liquid. The liquid handling robot also includes a controller that is configured to control movement of the arm relative to the worktable. A support fixture is fixed relative to the worktable at a location above the well plate. The support fixture includes two pieces pivotally connected and cylindrical cavities extending within the support fixture that are configured to hold chromatography columns in a vertical orientation relative to the worktable. With the two pieces of the support fixture pivoted relative to each other to an open position, the cylindrical cavities are exposed for insertion or removal of the chromatography columns. With the two pieces of the support fixture pivoted relative to each other to a closed position, an upper portion of the support fixture engages a collar of the chromatography column to secure the chromatography column in the support fixture. With the support fixture in the closed position, the controller is configured to move the set of tips to a position above the support fixture, extend into the chromatography columns held in the support fixture, dispense a desired amount of liquid in the chromatography columns for the chromatography columns to pass liquid down into the well plate, and withdraw the set of tips from the chromatography columns without disengaging the chromatography columns from the support fixture.

According to yet another aspect, a support fixture for chromatography columns operated by a liquid handling robot includes a first piece and a second piece pivotally connected to each other. The support fixture also includes cylindrical cavities extending within the support fixture and configured to hold the chromatography columns in a vertical orientation relative to the liquid handling robot. With the two pieces of the support fixture pivoted relative to each other to an open position, the cylindrical cavities are exposed for insertion or removal of the chromatography columns. With the two pieces of the support fixture pivoted relative to each other to a closed position, an upper portion of the support fixture engages a collar of the chromatography column to secure the chromatography column in the support fixture.

These aspects may include one or more of the following optional features. In some implementations, the two pieces are snap-fit together in the closed position. In some examples, the two pieces of the support fixture attach along an interfacing plane that is vertically oriented and intersects along the length of the cylindrical cavities. In other examples, the first piece of the support fixture includes a frame, and the second piece of the support fixture includes a lid. The frame may have a base and a column stand extending upward from the base, where the column stand includes the cylindrical cavities. The lid may be pivotally attached to the upper portion of the column stand, where the lid may include openings that axially align with the cylindrical cavities. Further, with the lid in the closed position, a lower surface of the lid may contact the collars of the chromatography columns in the cylindrical cavities.

In some implementations, the frame includes a seat portion that protrudes into a lower section of the cylindrical cavities for supporting a bottom portion of the chromatography columns therein. Also, in some examples, the upper portion of the column stand includes a peripheral surface that borders the cylindrical cavities, where the peripheral surface is configured to support the collars of the chromatography columns. The cylindrical cavities, in some examples, each has a continuous interior surface extending between the peripheral surface and the seat portion.

In further implementations, the first piece of the support fixture includes a frame having a base, a first column stand extending upward from the base, and a second column stand extending upward from the base at a spaced distance from the first column stand. The two column stands, in some examples, may have different sets of cylindrical cavities that are sized to support different sized chromatography columns. The frame may also include a drainage reservoir disposed between the two column stands.

This aspect may include one or more of the following optional features. In some implementations, the first piece of the support fixture includes a frame having a base and a column stand extending upward from the base, where the column stand generally houses the cylindrical cavities. In such an example, the second piece of the support fixture includes a lid pivotally attached to the upper portion of the column stand, where the lid has openings that axially align with the cylindrical cavities.

The details of one or more implementations of the disclosure are set forth in the accompanying drawings and the description below. These aspects and implementations, and other combinations from those described above, are indicative of various ways in which the subject matter may be practiced, all of which are intended to be within the scope of the claimed subject matter. Other aspects, features, and advantages will be apparent from the description and drawings, and from the claims.

DESCRIPTION OF DRAWINGS

FIG. 4 is an upper perspective view of an example of a support fixture mounted to a bridge stand.

FIG. 5 is another upper perspective view of the support fixture mounted to the bridge stand shown in FIG. 4.

Like reference symbols in the various drawings indicate like elements.

DETAILED DESCRIPTION

Figure 1:
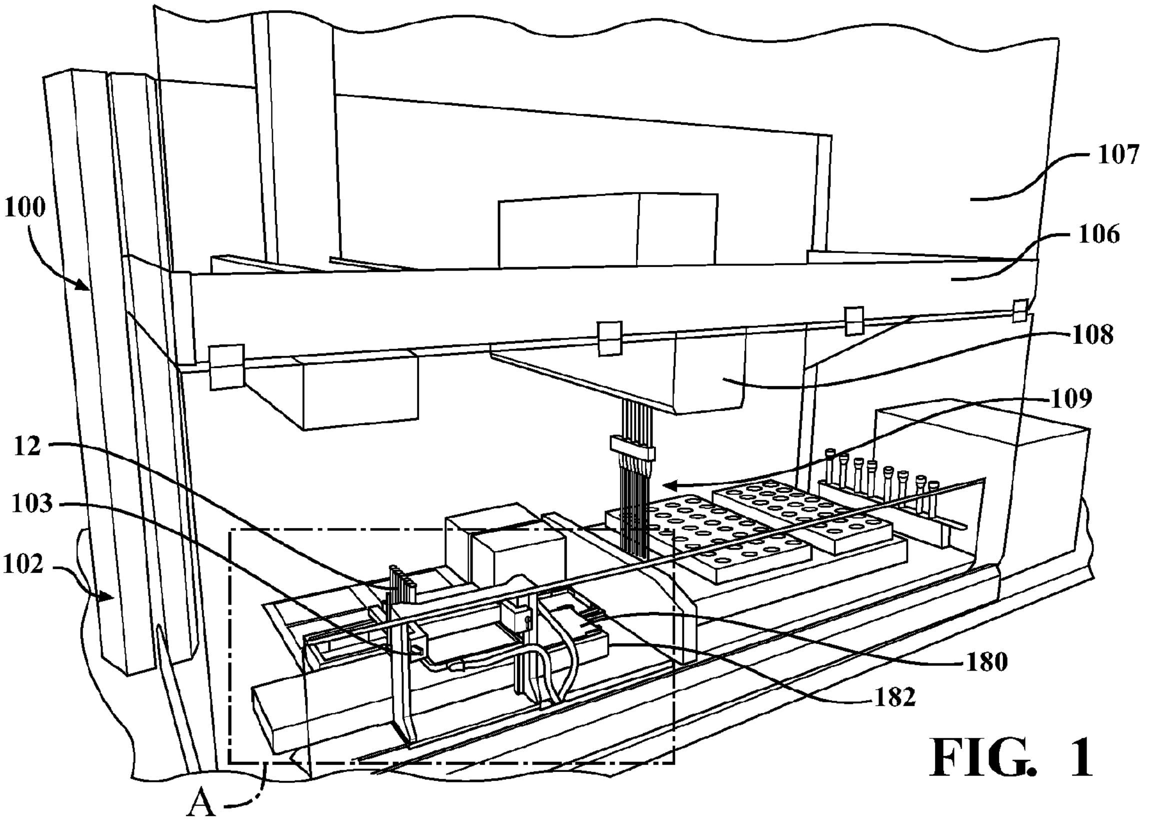
FIG. 1 is a perspective view of an exemplary station of an automated liquid handling system.

Referring now to the drawings and illustrative examples depicted therein, an automated liquid handling system 100 (FIG. 1) utilizes or operates chromatography columns to conduct chromatography experiments, such as microcolumns for rapid microscale biological process development. The automated liquid handling system 100 includes a station structure 102 that provides a worktable 104, which for purposes of this disclosure generally refers to a work surface for supporting experimental equipment and devices. As such, the worktable 104 may be an integrated surface or platform of the station structure or may be a lab table, countertop, or other surface generally utilized by the station structure. As shown in the example in FIGS. 1 and 1A, the worktable 104 is configured to support containers and other labware, such as microplates, well plates, tubes, and the like. Also, the worktable may include other devices that are integrated into the system 100, such as shakers, incubators, and the like. For example, as shown in FIG. 3, a well plate 105 is supported by the worktable 104 below the chromatography columns 12 in order to collect samples from the columns 12.

Figure 1A:
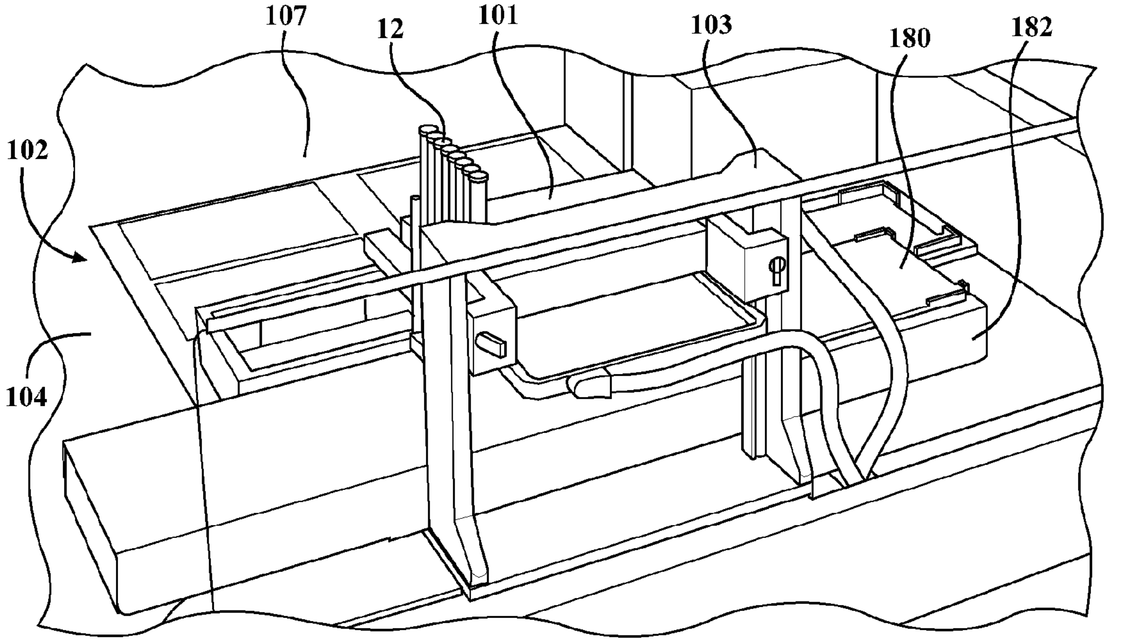
FIG. 1A is an enlarged perspective view of an area of the automated liquid handling system shown at Area A of FIG. 1.

The station structure 102 of the automated liquid handling system 100 may have various sizes and designs to accommodate different types of lab testing, capacities, and demand. As shown in FIG. 1, the station structure 102 includes a frame that surrounds the worktable 104 and supports a transparent cover 107 that prevents dust and contaminants from interfering with the worktable 104 and the devices and labware present on the worktable 104. The transparent cover 107 also serves as a safety barrier to prevent injury during operation. The transparent cover 107 or a front portion thereof may be raised and lowered, such as with the assistance of pneumatic cylinders, such to allow a user to access the worktable 104 for preparing an experiment before operation of the system.

The liquid handling system 100 also includes a liquid handling robot 106 to automate tasks in the operation of the chromatography columns 12. The liquid handling robot 106, such as show in FIG. 1, may include a gantry robot that is equipped with at least one manipulator, such as a liquid handling (LiHa) arm 108, that has means for aspirating and dispensing fluids. In additional implementations, the robotic arm 108 may be supported and operated with various different structures and mechanisms, such as an articulated robotic arm assembly. As shown in FIGS. 1 and 3, the arm 108 of the liquid handling robot 106 is suspended and operable to move relative to and over the worktable 104. Also, the arm 108 includes a set of tips 109 that are configured to aspirate and dispense liquid. The liquid handling robot 106 includes a controller that is programed or otherwise operated to control movement of the arm 108 relative to the worktable and to control independent or simultaneous operation of the tips 109.

Figure 3:
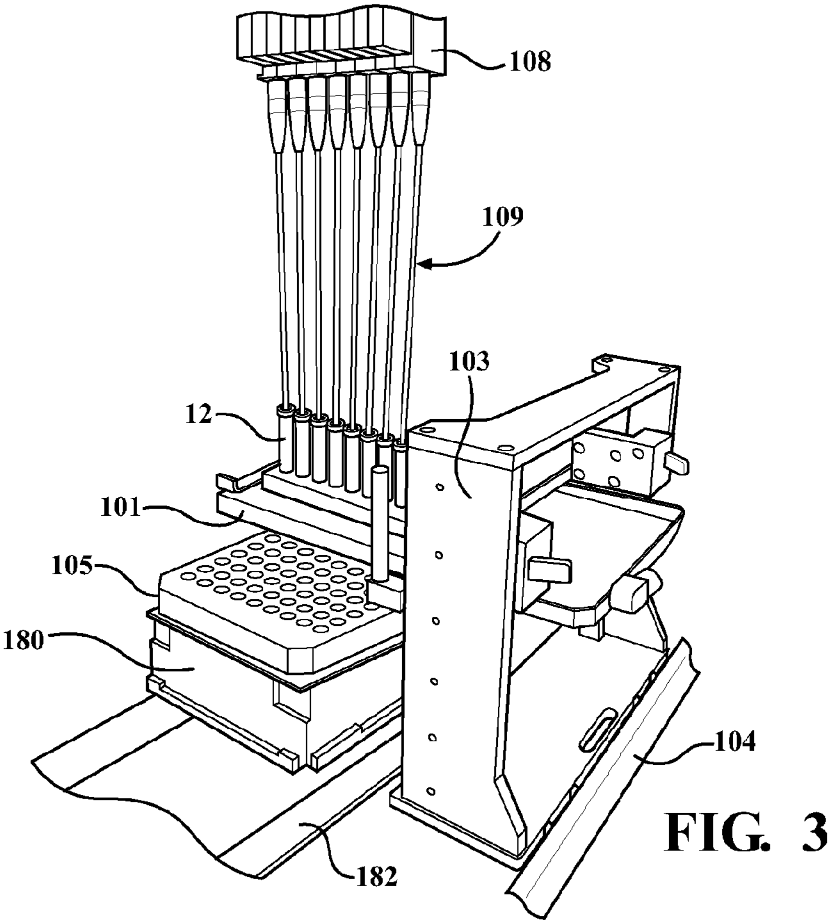
FIG. 3 is a perspective view of an example of chromatography columns being operated by a liquid handling robot.

As further shown in FIGS. 1 and 3, eight separate tips 109 are attached to the lower portion of the arm 108 with tapered nuts to secure the tips 109 to the arm 108. Each of the tips 109 include an elongated tube that extends vertically downward from the arm 108 toward the worktable 104. The distal ends of the tips 109 may be tapered or otherwise configured to be inserted into liquid containers or labware, such as the chromatography columns 12 shown and described herein. In additional implementations, the robotic arm may have more or few tips 109, such as 1, 8, 16, 48, 64, 96, or 384 tips, and the tips 109 may be attached to the arm 108 in various other manners.

Figure 2:
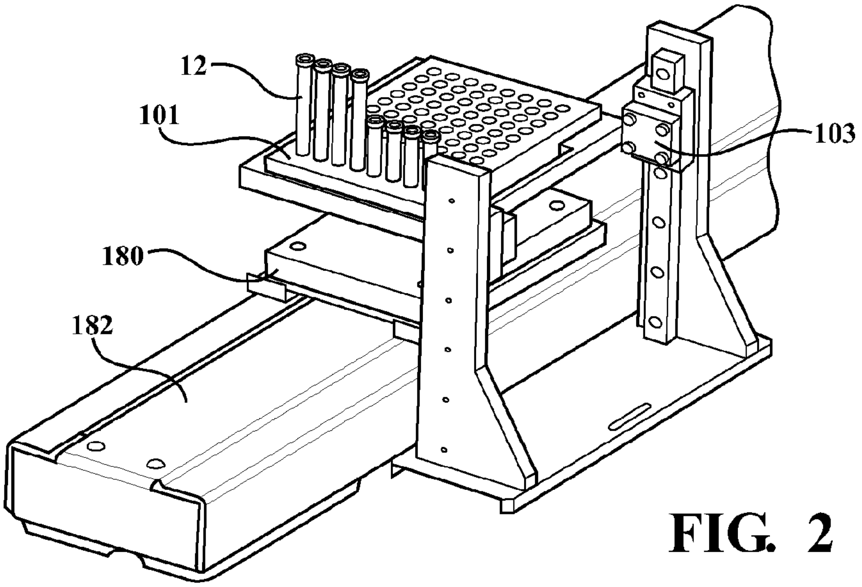
FIG. 2 is a perspective view of an example of a bridge stand for supporting chromatography columns operated by a liquid handling robot.

As shown in FIGS. 2 and 3, the chromatography columns 12 are simply placed in an array plate 101 that is supported by a bridge stand 103. Below the bridge stand 103, a plate carrier 180 is mounted on a shuttle 182, which is capable of moving horizontally along the longitudinal axis of the plate in order to collect the samples from the columns in a collection or well plate 105. Specifically, the shuttle 182 moves the well plate 105 to collect the fractions of dispensed liquids from the columns 12 along the rows of the plate 105. As shown in FIG. 3, the liquid handling robot 106 pipettes or otherwise dispenses liquids into the chromatography columns 12 and the column dispense liquid samples downward that are collected below the columns in the well plate 105. The support fixture 10 securely holds the chromatography columns relative a station structure, such as a liquid handling robotic workstation, so that the chromatography columns maintain accurate alignment with tips that are manipulated by the robot.

Figure 6:
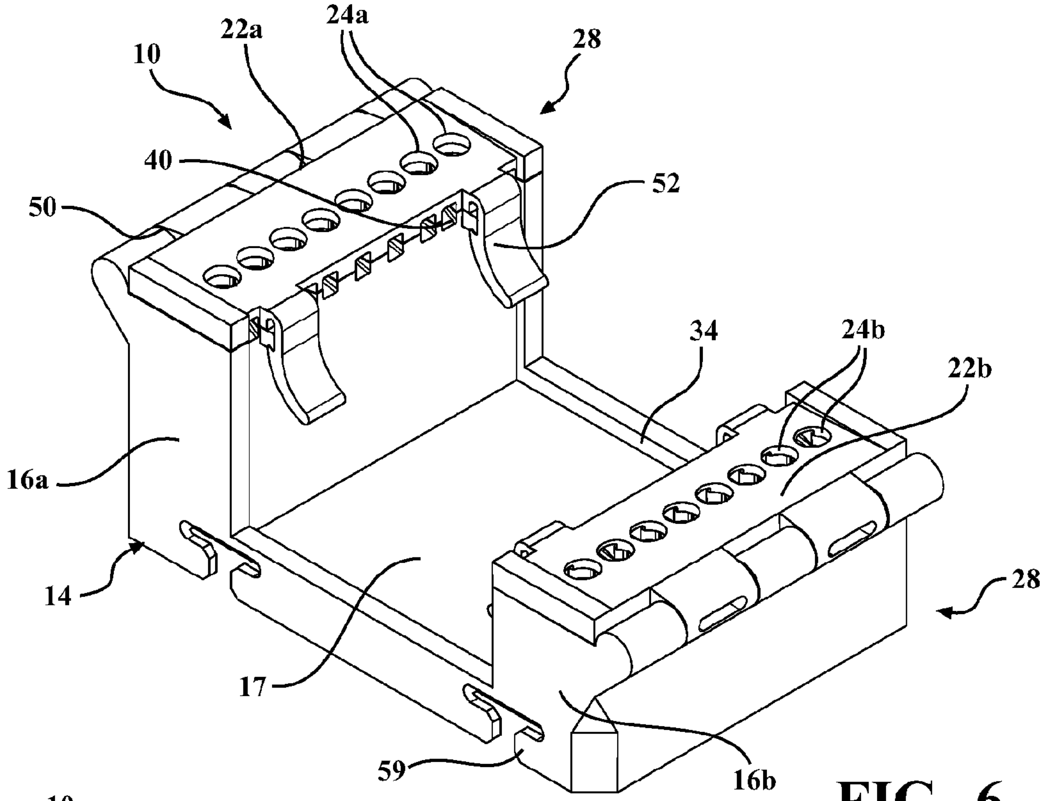
FIG. 6 is an upper perspective view of the support fixture of FIG. 4 removed from the bridge stand and showing the lids in a closed position.
Figure 7:
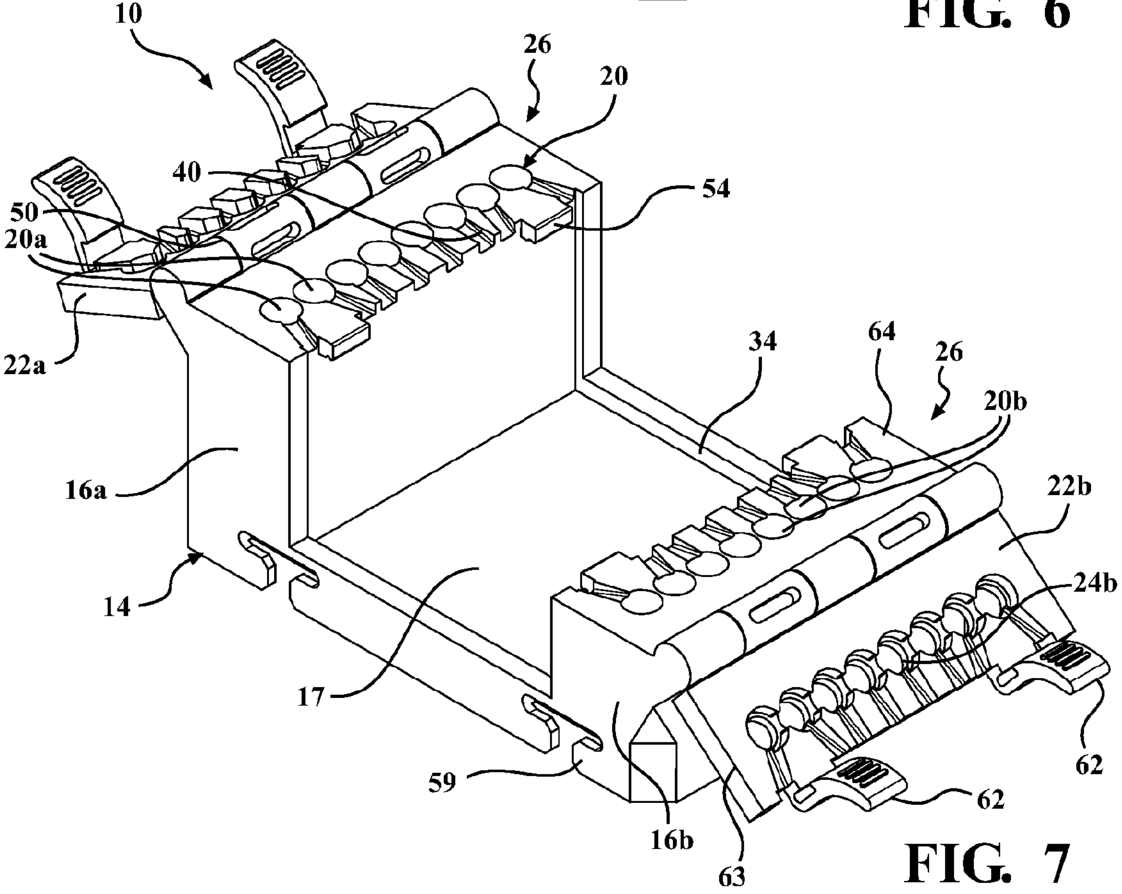
FIG. 7 is an upper perspective view of the support fixture of FIG. 6 showing the lids in an open position.

To resolve errors and other issues presented by the direct use of an array plate 101 (FIGS. 2 and 3) to support chromatography columns 12 in an automated liquid handling system, such as misalignment of the columns 12 with the tips 109, the chromatography columns 12 are secured by a support fixture 10, 110 as shown in the examples in FIGS. 4-14 and as further disclosed herein. The support fixture 10, 110 is fixed relative to the worktable 104 at a location above the well plate 105, such as at the bridge stand 103 shown in FIGS. 4 and 5. As shown in FIG. 6, the support fixture 10, 110 generally includes a first piece 14, 114 and a second piece 22*a*, 22*b*, 122 pivotally connected to each other. The support fixture 10, 110 also includes cylindrical cavities 20 that extend within the support fixture 10, 110 to secure and fully house the chromatography columns 12 in a vertical orientation relative to the worktable 104. With the first piece 14, 114 and the second piece 22*a*, 22*b*, 122 of the support fixture 10, 110 pivoted relative to each other to an open position 26, such as shown in FIGS. 7 and 9A, the cylindrical cavities 20 are exposed for insertion or removal of the chromatography columns 12. And further, with the first piece 14, 114 and the second piece 22*a*, 22*b*, 122 of the support fixture 10, 110 pivoted relative to each other to a closed position 28, such as shown in FIGS. 6 and 9B, the chromatography columns 12 are secured in the support fixture.

Referring now to FIGS. 4-12, the support fixture 10 has a frame 14 and two lids 22*a*, 22*b* that are removably attached to the frame 14, such as to secure and house the chromatography columns 12 in the support fixture 10 when engaged in the closed position 28 (FIG. 6) and to allow insertion and removal of the chromatography columns 12 when disengaged or otherwise removed to the open position 26 (FIG. 7). The frame 14 includes a base 17 and at least one column stand 16*a*, 16*b* extending upward from the base 17. The column stand or stands 16*a*, 16*b* may be integrally formed as a single piece with the base 17 of the fixture 10, such as with an injection molding or 3D printing process (e.g., fused filament fabrication or the like) as shown in FIGS. 4-12. It is also understood that the column stand or stands 16*a*, 16*b* may be otherwise be attached to the base 17 in a secure manner, such as with fasteners and/or adhesive, to provide the frame 14 of the support fixture 10 with a rigid and supportive structure to anchor the chromatography columns 12 relative to the station structure 102 during operation of the system.

As shown in FIGS. 6 and 7, the frame 14 has two column stands 16*a*, 16*b* that integrally extend upward from opposing longitudinal ends of the frame 14, where the longitudinal dimension of the frame 14 is referenced to generally correspond with the longitudinal dimension of the well plate 105 and its longitudinal movement on the shuttle 182 and corresponding track (FIG. 3). The column stands 16*a*, 16*b* each include bores or cylindrical cavities 20 that are dimensioned to house the chromatography columns 12. The cylindrical cavities 20 may be grouped into sets of cylindrical cavities 20*a*, 20*b* that are disposed in a row laterally across the respective column stands 16*a*, 16*b*, such as rows of eight cavities as shown in FIG. 7. The lids 22*a*, 22*b* are pivotally attached to the upper portions of the column stands 16*a*, 16*b* and each include openings 24*a*, 24*b* that extend through a thickness of the respective lid 22*a*, 22*b* and are aligned with the cylindrical cavities 20 to allow the tips 109 of the liquid handling robot 106 to access the chromatography columns 12 held in the cylindrical cavities 20 when the lids 22*a*, 22*b* are in the closed position 28. The openings 24*a*, 24*b*, as shown in FIG. 6, are circular holes that axially align with the cylindrical cavities 20. It is also contemplated that the openings 24*a*, 24*b* in the lid 22*a*, 22*b* may be differently shaped or interconnected as a single hole or slot.

As further shown in FIGS. 3-5, the frame 14 of the support fixture 10 is mounted to the bridge stand 103 that suspends the support fixture 10 over the well plate 105 supported by a plate carrier mounted on the shuttle at the worktable 104. To secure the support fixture 10 to the bridge stand 103, the frame 14 may have a mounting feature for attaching the support fixture to a worktable. As shown in FIGS. 4-7, the base 17 of the frame 14 has mounting features 59 configured to engage a locking mechanism 184, as shown in FIG. 4, on the bridge stand 103. The mounting features 59 include T-shaped slots that extend upward from a bottom surface of the base 17 and include horizontal portions that mate with the locking mechanism 184 on the bridge stand 103.

Figure 9A:
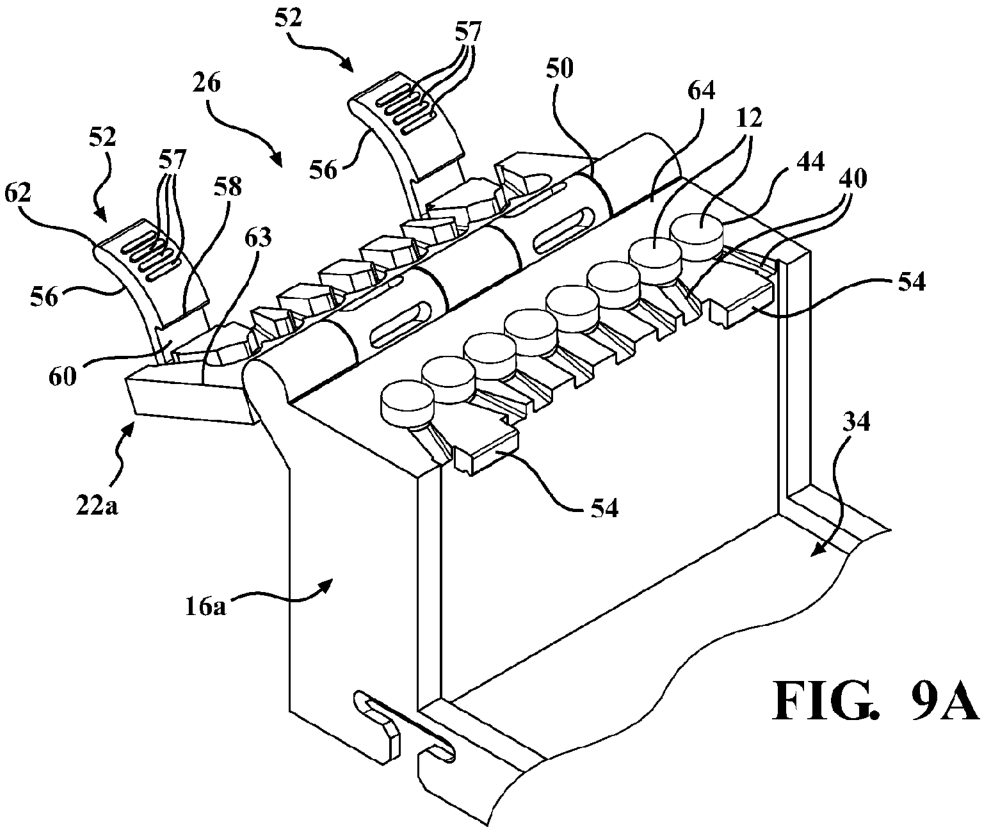
FIG. 9A is an upper perspective view of a section of the support fixture of FIG. 8 showing a column stand with the lid open.
Figure 9B:
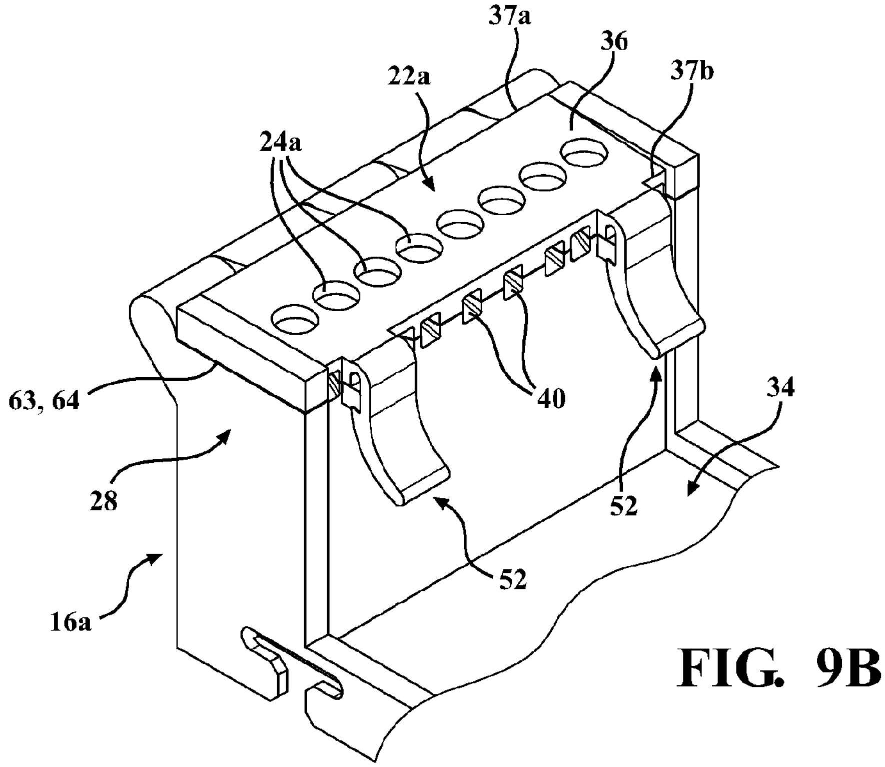
FIG. 9B is an upper perspective view of the section of the support fixture shown in FIG. 9A showing the lid closed.
Figure 11:
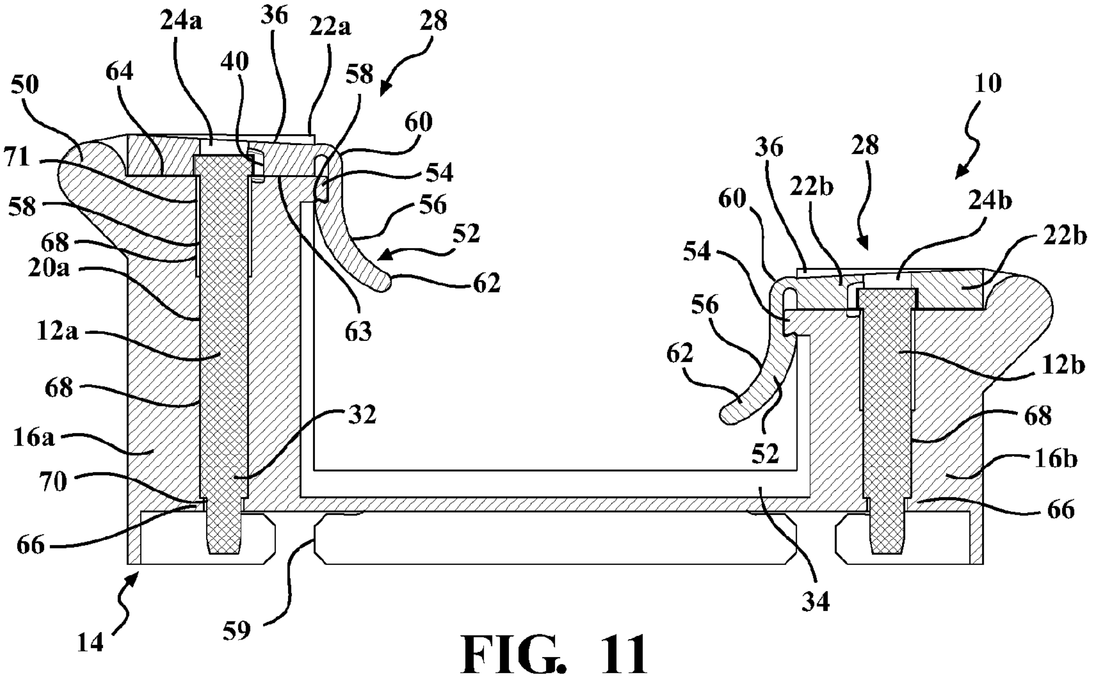
FIG. 11 is a cross-sectional view of the support fixture of FIG. 6 showing chromatography columns inserted in the column stands with the lids closed.

As shown in FIGS. 6 and 7, the column stands 16*a*, 16*b* are differently sized to each accommodate a corresponding size of chromatography column 12. Specifically, as shown in FIGS. 9A, 9B, and 11, one column stand 16*a* extends vertically from the base 17 to a greater height than the other column stand 16*b*. As such, the taller column stand 16*a* has a set of cylindrical cavities 20*a* that are sized for a larger (i.e., longer) set of chromatography columns 12*a* than the other column stand 16*b*, which has a correspondingly shallower set of cylindrical cavities 20*b* for a smaller (i.e., shorter) set of chromatography columns 12*b*. In other examples, the cavities 20*a*, 20*b* may have different diameters to accommodate chromatography columns 12 having different diameters. As further shown in FIG. 11, the column stand 16*a* and cylindrical cavities 20*a* are sized to hold chromatography columns 12*a* with a volume of 600 μl and the column stand 16*b* and cylindrical cavities 20*b* are sized to hold chromatography columns 12*b* with a volume of 200 μl. It is contemplated that in additional examples the column stands 16*a*, 16*b* may be sized to hold the same sized chromatography columns and that the differently sized columns may be various different volumes.

Figure 8:
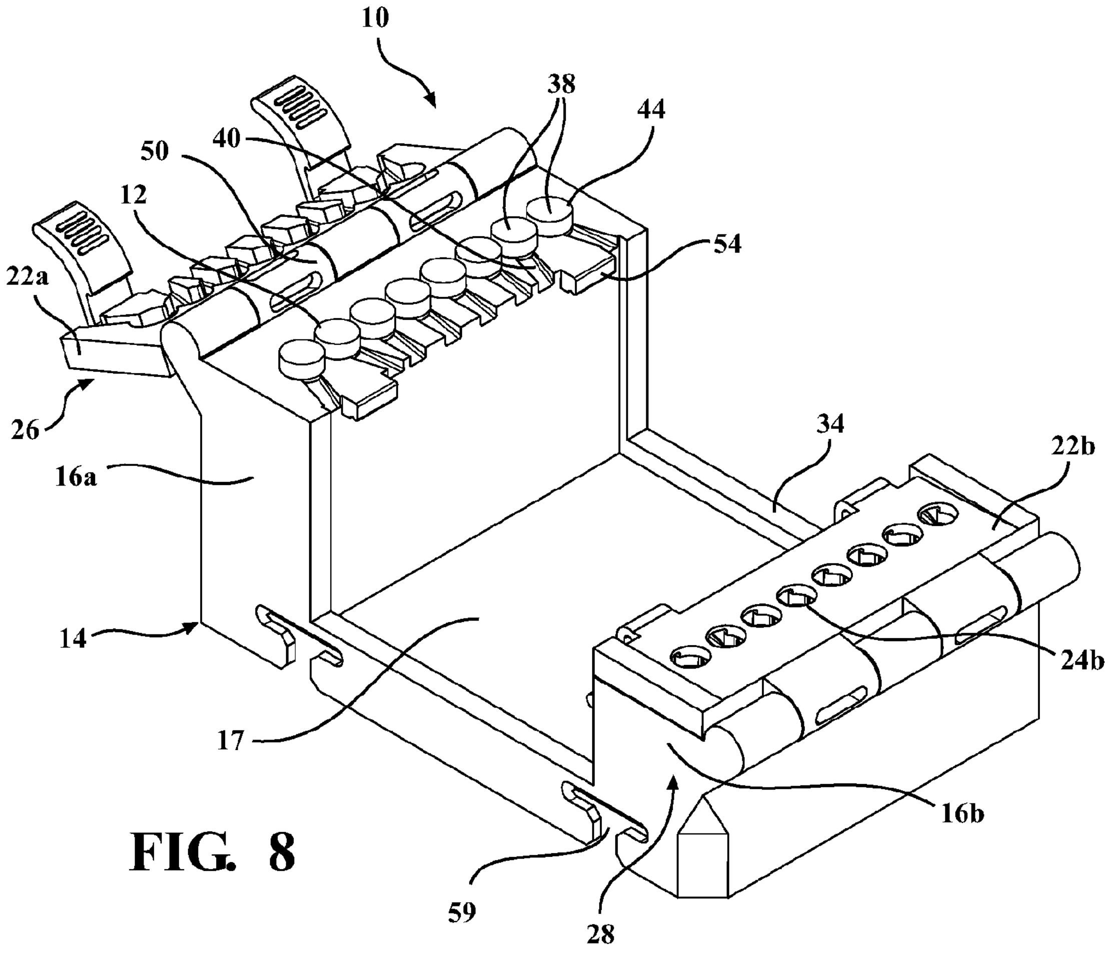
FIG. 8 is an upper perspective view of the support fixture of FIG. 6 showing chromatography columns inserted in one column stand with the lid open.

As shown in FIG. 7, the lids 22*a*, 22*b* are pivoted to the open position 26 about a hinge connection 50 between the outer edges of the lids 22*a*, 22*b* and the upper edges of the column stands 16*a*, 16*b* at the opposing longitudinal ends of the support fixture 10. The hinge connections 50 are configured to allow the lids 22*a*, 22*b* to pivot between the open position 26 (FIG. 7) and the closed position 28 (FIG. 6). As shown in FIG. 7, the lids 22*a*, 22*b* are pivoted away from each other when moving toward the open position 26 so as to remain connected to the frame and not interfere with each other when a lab technician is inserting or removing chromatography columns. Such a hinged connection assists with maintaining precise alignment of the openings 24*a*, 24*b* in the lids 22*a*, 22*b* with the cylindrical cavities 20*a*, 20*b*, while also not requiring assembly or other tasks that could reduce the efficiency in which a lab technician can load and unload chromatography columns 12. Further, the hinge connections 50 may be integrally formed between the frame 14 and the lids 22*a*, 22*b*, such as a living hinge or snap-fit hinge connection as shown in FIGS. 6-8, or may be other types of hinges, such as pin and barrel hinges or the like. It is also contemplated that the hinge connections in additional examples may be located at alternate sides of the lids 22*a*, 22*b* or may be replaced with releasable engagement connections, such as snap-fit connections, to make the lids 22*a*, 22*b* entirely removable.

As further shown in FIGS. 6-11, the lids 22*a*, 22*b* may also include a locking element 52 that releasably engages to the column stand 16*a*, 16*b* when the lid 22*a*, 22*b* is moved to the closed position 28. The upper portions of the column stands 16*a*, 16*b* may also include corresponding engagement elements 54 that engage the locking elements 52 on the lids 22*a*, 22*b*. In the illustrated example, the locking element 52 and the engagement elements 54 cooperate to provide a snap-fit interface. The snap-fit connection between the locking elements 52 and the engagement elements 54 is configured to hold the lids 22*a*, 22*b* in the closed position 28 and prevent the chromatography columns 12 from pulling the lids 22*a*, 22*b* open, such as from the frictional force of the tips 109 being withdrawn upward from a top opening 38 (FIG. 8) of the chromatography columns 12 during operation of the liquid handling system 100.

Figure 10:
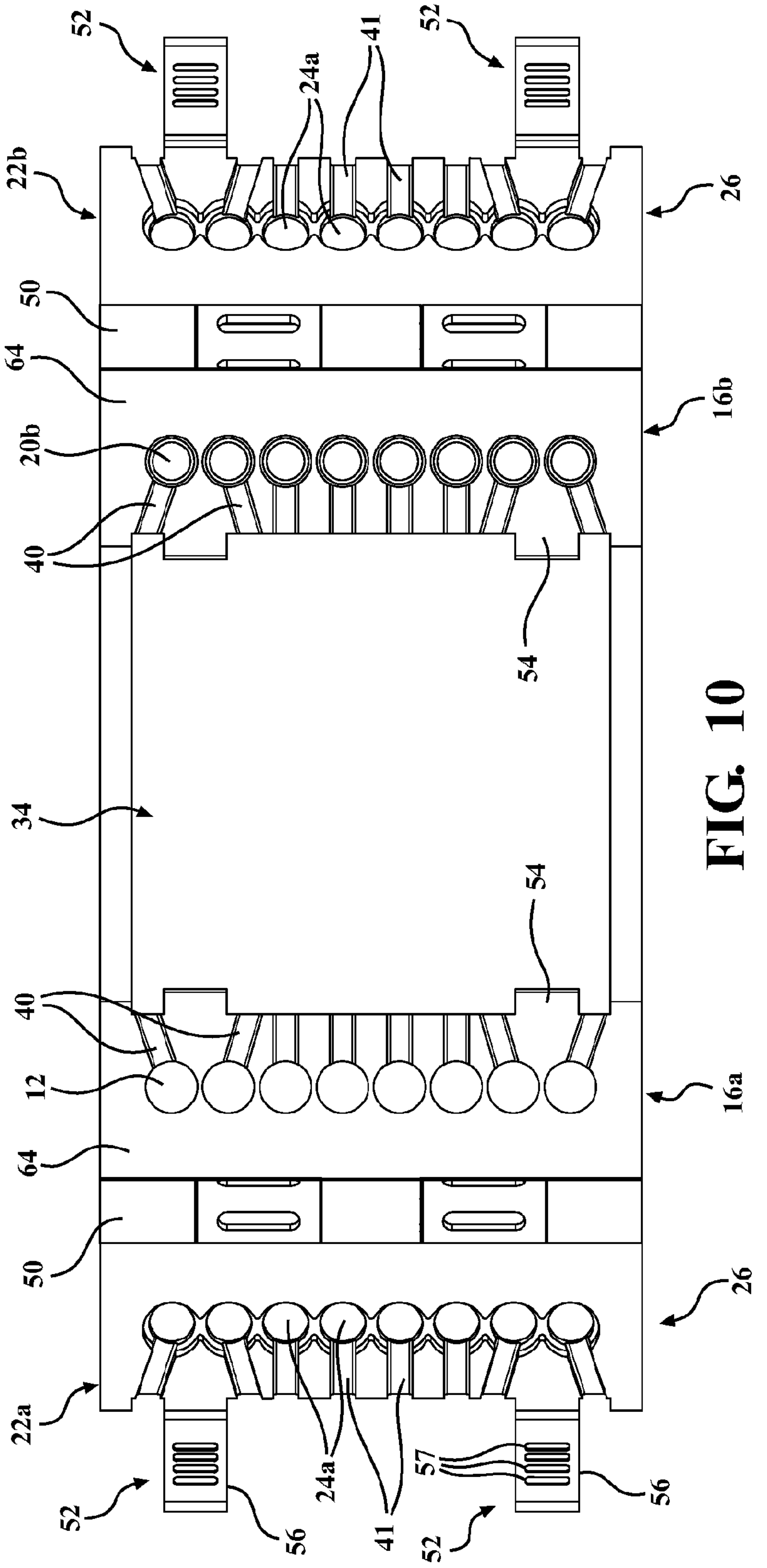
FIG. 10 is a top plan view of the support fixture of FIG. 6 showing representative chromatography columns inserted in one column stand and the lids open

As shown in FIGS. 9A, 9B, and 10, the locking elements 52 are disposed at the inner edges of the lids 22*a*, 22*b* and have a tab member 56 protruding downward when the lid 22*a*, 22*b* is in the closed position 28. The tab members 56 each include a catch 58 that is designed to receive or snap-fit in a cantilever manner to a lower edge of the engagement element 54 that protrudes longitudinally from the inner edge of the column stands 16*a*, 16*b*. The tab members 56 may include a narrowed portion 60 (FIG. 11), such as at the connection interface with the lid 22*a*, 22*b*, which assists to enable the resilient flexibility of the tab member 56. In the closed position 28, the tab members 56 extend downward beyond the engagement elements 54 and terminate at a distal portion 62 of the tab members that provide access to a user's finger, such that the tab members 56 can resiliently flex when a user manually pulls the tab members 56 away from the engaged column stand 16*a*, 16*b* to release the snap-fit connection therewith. The tab members 56 may also include frictional features, such as ribs 57, used to assist a user's engagement with the tab member 56. Further, when the lids 22*a*, 22*b* are pivoted toward the closed position 28, the distal portion 62 of the tab member 56 may be curved or angled so that downward force on the lid 22*a*, 22*b* causes the tab members 56 flex past the engagement element 54 for the catch 58 to snap-fit to the engagement element 54.

Additionally or alternatively, the locking elements 52 and/or the engagement elements 54 may be configured to provide a slidable lock interface, whereby at least one of the locking elements 52 and/or the engagement elements 54 translates along the lateral direction of the frame 14 to selectively engage and disengage. For example, the locking elements 52 may be moved to a first, unlocked position that is laterally offset (i.e., not aligned along the longitudinal dimension) from the engagement elements 54 such that the locking elements 52 are positioned to pass alongside the engagement elements 54 when the lids 22*a*, 22*b* are moved from the open position 26 to the closed position 28. With the lid in the closed position 28, the locking elements 52 are translated along the lateral direction from the first, unlocked position to a second, locked position. In the locked position, the catch 58 is positioned beneath the engagement element 54 such that the engagement element 54 is received adjacent to the narrowed portion 60. To unlock the lids 22*a*, 22*b*, the locking element 52 is returned to the first, unlocked position along the lateral direction such that the locking element 52 can pass alongside the engagement element 54 as the lids 22*a*, 22*b* move from the closed position 28 to the open position 26. Other examples of sliding long interfaces may also be utilized to secure the lids 22*a*, 22*b* in the closed position 28, such as sliding pins or the like.

Figure 12:
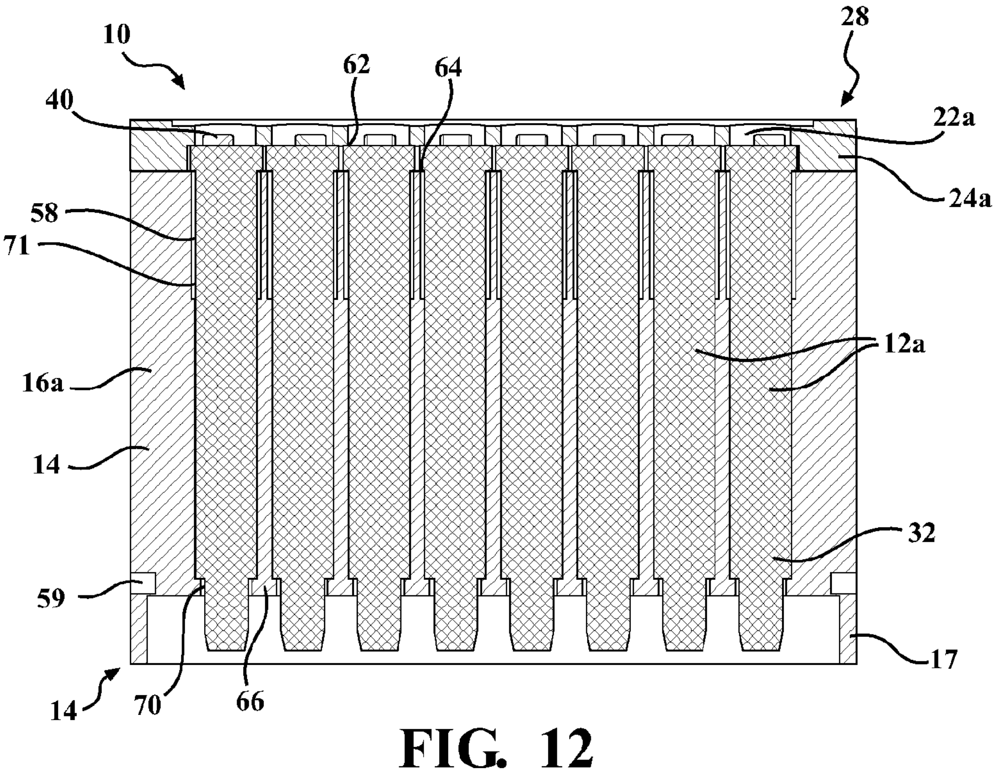
FIG. 12 is another cross-sectional view of the support fixture of FIG. 11.

As also shown in FIGS. 11 and 12, with the lids 22*a*, 22*b* in the closed position 28, a lower surface 63 of the lid 22*a* contacts the collars 44 of the chromatography columns 12 in the cylindrical cavities 20*a*, 20*b*. Similarly, the upper portion of the column stands 16*a*, 16*b* includes a peripheral surface 64 that borders the upper ends of the cylindrical cavities 20*a*, 20*b*, such as shown in FIG. 9A. The peripheral surface 64 may support the lower surface of the collars 44 of the chromatography columns 12. Also or alternatively, the chromatography columns 12 may be supported by a seat portion 66 of the base 17 of the frame 14 that radially protrudes into lower sections of the cylindrical cavities 20*a*, 20*b* for supporting a bottom portion 32 of the chromatography columns 12 inserted therein. The bores or cylindrical cavities 20*a*, 20*b* have a continuous interior surface 68 that extends between the peripheral surface 64 and the seat portion 66.

As further shown in FIGS. 11 and 12, the cylindrical cavities 20*a*, 20*b* each have a bottom hole 70 in the base 17 of the frame 14, such as shown surrounded by the seat portion 66. The bottom holes 70 are configured for liquid in the chromatography columns 12 to dispense down through the support fixture and into a well plate disposed below the support fixture 10. The tip portions of the chromatography column 12 may extend through the bottom holes 70 when inserted into the cylindrical cavities 20*a*, 20*b*. The cylindrical cavities 20*a*, 20*b* shown in FIGS. 11 and 12 each also have a widened upper section 71 that is configured to prevent interference with labels or indicia disposed at an upper portion of the inserted chromatography columns 12.

During operation of the liquid handling system 100, liquid may escape a top opening 38 of the chromatography columns 12 or may otherwise leak or drip from the tips 109. The frame 14 may include a drainage reservoir 34 to collect such waste fluids. Referring again to FIGS. 6-10, the drainage reservoir 34 is disposed adjacent to and between the column stands 16*a*, 16*b*. The drainage reservoir 34 includes longitudinal containment barriers that surround a low basin surface, so that liquids accumulated on the low basin surface do not leak out of the drainage reservoir 34. The drainage reservoir 34 may include a drain, such as an opening disposed at the lowest section of the drainage reservoir 34 that is configured to dispense collected fluids to a waste tray 188, such as shown in FIGS. 4 and 5.

To direct fluids to the drainage reservoir 34, the lids 22*a*, 22*b* include a sloped surface 36 (FIG. 9B) descending from and around the openings 24*a*, 24*b* toward the drainage reservoir 34, so that liquid that escapes a top opening 38 of one of the chromatography columns 12 in the cylindrical cavities 20*a*, 20*b* flows down the sloped surface 36 toward and into the drainage reservoir 34. The sloped surface 36 of the lid 22*a* shown in FIG. 9B is substantially planar and extends from an outer edge 37*a* near the hinge connection 50 to the inner edge 37*b*. Also, the peripheral surface 64 (FIGS. 9A, 9B, and 10) of the column stands 16*a*, 16*b* at least partially interface with the lower surface of the lids 22*a*, 22*b* in the closed position 28 (FIG. 9B). As further shown in FIG. 9A, channels 40 are disposed at the peripheral surfaces 64 and extend from the cylindrical cavities 20*a*, 20*b* toward and into the drainage reservoir 34, such that the channels 40 are configured to direct fluid toward and into the drainage reservoir 34. The lower surfaces of the lids 22*a*, 22*b* may also include corresponding channels 41 that interconnect with the channels 40 in the upper peripheral surface 64, such as shown in FIGS. 9B and 10.

With the support fixture 10 housing chromatography columns 12 with the lids 22*a*, 22*b* in the closed position, the controller is configured to move the set of tips 109 to a position above the support fixture 10, extend into the chromatography columns 12 held in the support fixture 10, dispense a desired amount of liquid in the chromatography columns 12 for the chromatography columns 12 to pass liquid down into the well plate 105, and withdraw the set of tips from the chromatography columns without disengaging the chromatography columns from the support fixture.

The controller of the liquid handling robot 106 may utilize data processing hardware and memory hardware in communication with the data processing hardware. The memory hardware stores instructions that when executed on the data processing hardware cause the data processing hardware to perform operations of the controller. In some implementations, the robotic arm 108 is connected to an on-board embedded controller that runs the appropriate firmware. This unit is capable of processing machine commands. The liquid handling scripts are written in the client (PC) application, which translates it to machine commands. The controller thereby is configured to control movement of the arm 108 and associated tips 109 relative to the worktable 104, such that the controller is configured to move the arm 108 to a position above the support fixture. With the arm 108 in this elevated position, the controller can control the liquid handling robot 106 to insert the tips 109 into the chromatography columns 12 held in the support fixture 10, dispense liquid into the columns, and then raise the tips 109 upward out of the chromatography columns 12 held in the support fixture 10, where the support fixture 10 retains the chromatography columns 12 relative to the worktable 104.

Figure 13:
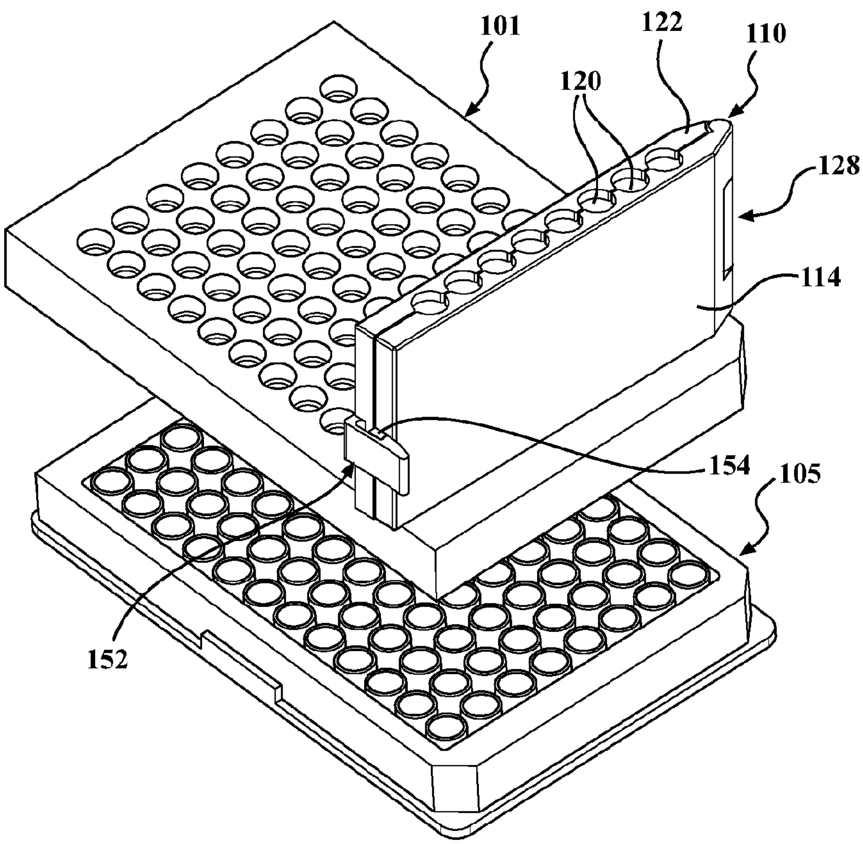
FIG. 13 is an upper perspective view of another example of a support fixture supported by an array plate suspended above a well plate.
Figure 14:
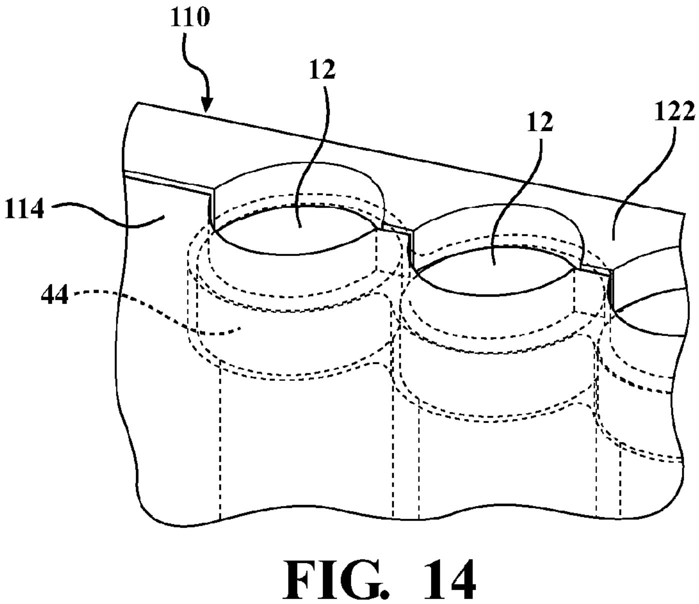
FIG. 14 is an enlarged perspective view of the support fixture of FIG. 13 showing chromatography columns held in the support fixture.

Referring now to FIGS. 13 and 14, a support fixture 110 is shown that has a first piece 114 and a second piece 122 pivotally connected to each other. The support fixture 110 also includes cylindrical cavities 120 that extend within the support fixture 110 to secure and fully house the chromatography columns 12 in a vertical orientation relative to the worktable 104. The two pieces 114, 122 of the support fixture 110 attach along an interfacing plane that is vertically oriented and intersects along the length of the cylindrical cavities 120. The two pieces 114, 122 of the support fixture 110 pivot relative to each other to an open position to expose the cylindrical cavities 120 for insertion or removal of the chromatography columns 12. Further, the two pieces 114, 122 of the support fixture 110 pivot relative to each other to a closed position 128, such as shown in FIG. 13, that secures the chromatography columns 12 in the support fixture 110. Features of the support fixture 110 and associated liquid handling system that are similar to the support fixture 10 and associated liquid handling system 100 are not described in detail again, and similar reference numbers are used to identify these similar features, incremented by 100.

For purposes of this disclosure, the term "coupled" (in all of its forms, couple, coupling, coupled, etc.) generally means the joining of two components directly or indirectly to one another. Such joining may be stationary in nature or movable in nature; may be achieved with the two components and any additional intermediate members being integrally formed as a single unitary body with one another or with the two components; and may be permanent in nature or may be removable or releasable in nature, unless otherwise stated.

Also for purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

A number of implementations have been described. Nevertheless, it will be understood that various modifications may be made without departing from the spirit and scope of the disclosure. Accordingly, other implementations are within the scope of the following claims.

What is claimed is:

1. A support fixture for chromatography columns operated by a liquid handling robot, the support fixture comprising:

a frame having at least one column stand extending vertically upward from a base of the frame and terminating at an upper portion, and a drainage reservoir horizontally offset from the at least one column stand, the at least one column stand comprising a plurality of bores extending vertically between the base and the upper portion of the at least one column stand;

a lid movably attached to the upper portion of the at least one column stand and including a sloped surface;

wherein the lid is movable between an open position configured to allow insertion of chromatography columns into the plurality of bores and a closed position configured to secure the chromatography columns in the plurality of bores; and wherein the lid includes a plurality of openings that axially align with the plurality of bores with the lid in the closed position and the sloped surface descends from the plurality of openings toward the drainage reservoir with the lid in the closed position to retain liquid that escapes a top opening of one of the chromatography columns in the plurality of bores.

2. The support fixture of claim 1, wherein the frame further comprises a seat portion protruding into a lower section of the plurality of bores for supporting a bottom portion of the chromatography columns inserted in the plurality of bores.

3. The support fixture of claim 1, wherein the plurality of bores comprises a first set of bores disposed in a row across the at least one column stand.

4. The support fixture of claim 3, wherein the frame comprises a second column stand extending upward from the base and terminating at an upper portion, the second column stand comprising a second set of bores extending vertically between the base and the upper portion of the second column stand, and wherein the second set of bores are sized to support a different sized chromatography column than the first set of bores.

5. The support fixture of claim 4, further comprising a second lid movably attached to the upper portion of the second column stand, the second lid having a plurality of openings that axially align with the second set of bores with the second lid in a closed position.

6. The support fixture of claim 1, wherein the upper portion of the at least one column stand comprises channels that extend from the plurality of bores toward the drainage reservoir.

7. The support fixture of claim 1, wherein the upper portion of the at least one column stand comprises a peripheral surface that borders at least one bore of the plurality of bores, the peripheral surface configured to support a collar of at least one of the chromatography columns inserted into the plurality of bores.

8. The support fixture of claim 7, wherein the at least one bore of the plurality of bores comprises a continuous interior surface extending between the peripheral surface and a seat portion disposed at a lower section of the at least one bore.

9. The support fixture of claim 7, wherein the lid comprises a lower surface that surrounds at least one of the plurality of openings, and wherein with the lid in the closed position, the lower surface is configured to contact the collar of at least one of the chromatography columns in the plurality of bores.

10. The support fixture of claim 1, wherein the lid is pivotally coupled at a hinge connection with the upper portion of the at least one column stand and is configured to pivot between the open and closed positions.

11. The support fixture of claim 1, wherein the lid comprises an engagement feature that snap-fits to the at least one column stand when the lid is moved to the closed position.

12. The support fixture of claim 1, wherein the plurality of bores comprises at least eight bores.

13. The support fixture of claim 1, wherein the plurality of bores are sized to accommodate chromatography columns with a volume of 200 μl or 600 μl.

14. The support fixture of claim 1, wherein the plurality of bores each comprise a bottom hole in the base of the frame that is configured for liquid in the chromatography columns to dispense down through the bottom holes into a well plate disposed below the support fixture, and wherein the bottom holes are each configured to receive a tip of a chromatography column.

15. The support fixture of claim 1, wherein the plurality of bores each comprise a widened upper section in the at least one column stand, the widened upper section configured to prevent interference with labels or indicia disposed at an upper portion of the inserted chromatography columns.

16. The support fixture of claim 1, wherein the frame comprises a mounting feature for attaching the support fixture to a worktable.

17. The support of claim 1, wherein:

the frame and the lid are pivotally connected to each other; and the plurality of bores are extending configured to hold the chromatography columns in a vertical orientation relative to a worktable of the liquid handling robot;

wherein with the frame and the lid of the support fixture pivoted relative to each other to the open position, the plurality of bores are exposed for insertion or removal of the chromatography columns; and wherein with the frame and lid of the support fixture pivoted relative to each other to the closed position, an upper portion of the support fixture engages a collar of the chromatography column to secure the chromatography column in the support fixture.

18. The support fixture of claim 17, wherein the lid comprises an engagement feature that snap-fits to the at least one column stand when the lid is moved to the closed position.

19. The support fixture of claim 17, wherein the frame and the lid of the support fixture attach along an interfacing plane that is vertically oriented and intersects along a height of the plurality of bores.

* * * * *